United States Patent [19]

Waldschütz et al.

[11] 4,380,341
[45] Apr. 19, 1983

[54] LABYRINTH SEAL FOR SLIP RING SWITCH FOR STEERING WHEELS OF MOTOR VEHICLES

[75] Inventors: Heinz Waldschütz, Ostfildern; Franz Raüner, Stuttgart; Helmut Patzelt, Fellbach, all of Fed. Rep. of Germany

[73] Assignee: Daimler-Benz A.G., Stuttgart, Fed. Rep. of Germany

[21] Appl. No.: 354,919

[22] Filed: Mar. 8, 1982

[30] Foreign Application Priority Data

Mar. 7, 1981 [DE] Fed. Rep. of Germany ....... 3108757

[51] Int. Cl.³ .......................... F16J 15/44; H01H 9/04
[52] U.S. Cl. ......................................... 277/56; 277/12; 277/DIG. 4; 74/552; 200/61.55
[58] Field of Search .................................. 277/53–57, 277/12, 32, DIG. 4; 74/552; 200/61.54, 61.55, 61.56

[56] References Cited

U.S. PATENT DOCUMENTS

| 2,616,002 | 10/1952 | Junker et al. | 200/61.55 |
| 2,631,204 | 3/1953 | Kibiger | 200/61.55 |
| 2,766,022 | 10/1956 | Bender | 277/56 X |
| 3,038,054 | 6/1962 | Naimer | 277/56 X |
| 3,910,597 | 10/1975 | Seko | 74/552 X |

Primary Examiner—Robert S. Ward, Jr.
Attorney, Agent, or Firm—Paul M. Craig, Jr.

[57] ABSTRACT

A slip ring arrangement for steering wheels of motor vehicles, with the slip ring arrangement being adapted to not only supply power to a signal horn of the motor vehicle but also to a gas generating unit for an inflatable air bag installation. The slip ring arrangement is sealed with respect to a passenger compartment of the motor vehicle by a contact sealing system in the form of a labyrinth seal.

8 Claims, 1 Drawing Figure

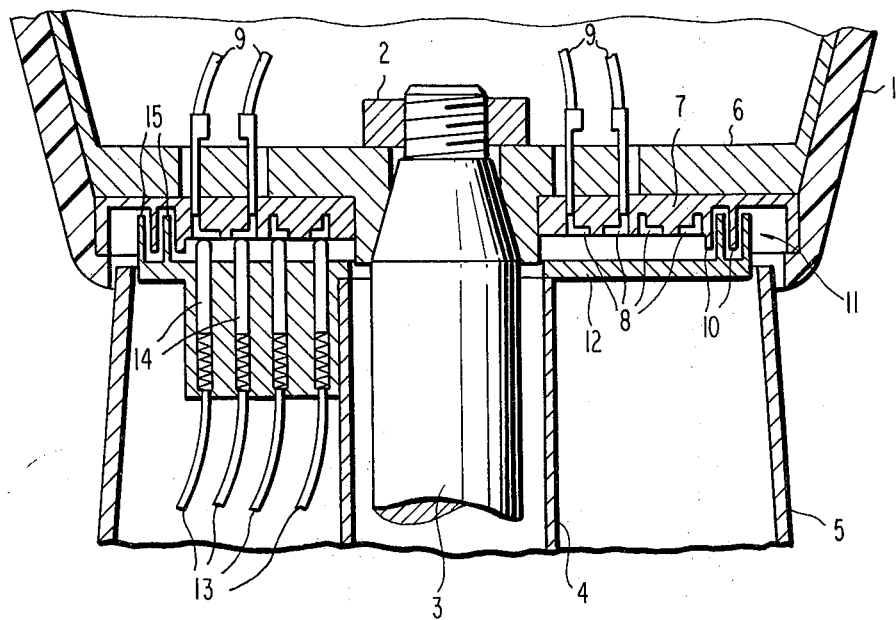

LABYRINTH SEAL FOR SLIP RING SWITCH FOR STEERING WHEELS OF MOTOR VEHICLES

The present invention relates to a steering wheel and, more particularly, to a slip ring arrangement for motor vehicle steering wheels which includes a plurality of slip rings cooperable with spring mounted mating contacts adapted to function to transmit an electrical current for a signal horn and for an inflatable air cushion arrangement for protecting a driver of the motor vehicle.

Slip ring arrangements for steering wheels of motor vehicles have been proposed wherein, in an axial direction, the slip rings are loaded by carbon brushes and, generally, such arrangement works satisfactorily only with respect to supplying an electrical current to a signal horn of the motor vehicle; however, if, for example, it is necessary to consider supplying an electric current to an inflatable gas or air bag housed in a steering wheel of the motor vehicle, considerably higher requirements must be imposed with respect to operating safety under all operating conditions of the motor vehicle which can occur in practice.

One problem with conventional proposed slip ring arrangements resides in the fact that, when the vehicle is started up at very low temperatures, it is possible for the slip rings to ice up thereby, at least, comprimising a realiable transmission of electric current. To compensate for this potential problem, it has been proposed that the slip ring arrangements be allowed to cooperate with complete mating rings instead of with individual carbon brushes thereby providing a constant cover of the slip area in order to prevent or compensate for the potential icing. However, a disadvantage of this proposal resides in the fact that considerably higher construction expenses are incurred and, additionally, undesirable disturbing rubbing noises may be experienced during operation of the motor vehicle due to the large contact surfaces slipping against one another.

The aim underlying the present invention essentially resides in providing a slip ring arrangement for a steering wheel of a motor vehicle which ensures a very high operating safety.

In accordance with advantageous features of the present invention, a slip ring arrangement for steering wheels of a motor vehicle is provided which includes slip rings cooperating with spring-mounted mating contacts which function to transfer electrical current or power to a signal horn and, for example, an inflatable gas or air bag to protect the driver, with the slip ring arrangement being sealed, with respect to a passenger compartment of the motor vehicle, by a sealing labyrinth.

Advantageously, in accordance with the present invention, the sealing labyrinth should preferably be a part of a slip ring support which is preferably made of a plastic material.

By virtue of the above noted features of the present invention, a contactless sealing system is provided which cannot cause any disturbing slipping or rubbing noises during an operation of the steering wheel.

In accordance with still further features of the present invention, a strap down area of the sealing labryinth may also be formed by a labyrinth plate which is secured by the outer steering column and is preferably made of a plastic material.

Advantageously, a strap down area of the sealing labyrinth may by a labyrinth plate which is secured by the outer steering column and is preferably made of a plastic material.

The labyrinth plate may, in accordance with the present invention, also simultaneously perform a function of guiding the spring-mounted mating contacts which may be constructed as carbon brushes.

Accordingly, it is an object of the present invention to provide a slip ring arrangement for steering wheels of motor vehicles which avoids, by simple means, shortcomings and disadvantages encountered in the prior art.

Another object of the present invention resides in providing slip ring devices for steering wheels of motor vehicles which is simple in construction and therefore relatively inexpensive to manufacture.

Yet another object of the present invention resides in providing a slip ring device for steering wheels of motor vehicles which ensures a transmission of an operating electrical current to associated components of the motor vehicle under all operating conditions of the motor vehicle.

A still further object of the present invention resides in providing a slip ring arrangement for steering wheels of a motor vehicle which provides for a contactless sealing system.

These and other objects, features, and advantages of the present invention will become more apparent from the following description when taken in connection with the accompanying drawing which shows, for the purpose of illustration only, one embodiment in accordance with the present invention, and wherein:

The single FIGURE of the drawing is a cross sectional view through an area of a connection between a steering wheel and steering shaft of a motor vehicle.

Referring now to the single FIGURE of the drawing, according to this figure, a steering wheel 1 is secured through a nut 2 at an upper end of a steering shaft 3, with the steering shaft 3 being surrounded by an outer steering column 4 and an outer steering column jacket 5. A slip ring support 7, preferably made of a plastic material is secured at a bottom of a steering wheel hub 6, with slip ring pairs 8 being inserted into the slip ring support 7. The slip ring pairs 8 are connected to a cable connection 9 which extend, in a manner not shown in detail in the drawings, to, for example, a switch for a signal horn (not shown) or a gas generator unit (not shown), of a conventional construction, for an inflatable gas bag. Wall portions or parts 10 extend from a lower surface of the slip ring support 7, with the wall portions 10 forming rotating parts of a sealing labyrinth generally designated by the reference numeral 11. The wall portions 10 extend in parallel to a center longitudinal axis of the steering shaft 3.

A labyrinth plate 12 is provided and forms a counterpart to the slip ring support 7. The labyrinth plate 12, preferably formed of a plastic material, is secured at the outer steering column 4, with the labyrinth plate 12 being adapted to accommodate or hold spring mounted carbon brushes 14 having connected thereto appropriate cable connections 13.

The labyrinth plate 12 includes a plurality of wall portions 15 which extend outwardly from a surface thereof in a direction parallel to the direction of the longitudinal axis of the steering shaft 3, with the wall portions 15 being arranged with respect to the wall portions 10 of the ring support 7 so as to complete the sealing labyrinth 11.

The operating safety of the slip ring device constructed in accordance with the present invention is greater the smaller a volume of the compartment sealed by the sealing system represented by the sealing labyrinth 11.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A slip ring arrangement for a steering wheel of a motor vehicle, the arrangement including at least one slip ring, spring-mounted mating contact means cooperable with the at least one slip ring for enabling a transmitting of an electrical current to components of the motor vehicle, characterized in that a labyrinth seal means is provided for sealing the slip ring arrangement with respect to a passenger compartment of the motor vehicle.

2. A slip ring arrangement according to claim 1, characterized in that the labyrinth seal means includes a slip ring support adapted to be arranged on a portion of a steering wheel of the vehicle.

3. A slip ring arrangement according to claim 2, characterized in that the labrinth sealing means includes a labyrinth plate adapted to be secured to an outer steering column of the steering wheel.

4. A slip ring arrangement according to claim 3, characterized in that means are provided in the labyrinth plate for guiding the spring mounted mating contacts.

5. A slip ring arrangement according to one of claims 3, or 4, characterized in that at least one of the slip ring support and the labyrinth plate is made of a plastic material.

6. A slip ring arrangement according to one of claims 3 or 4, characterized in that both the slip ring support and the labyrinth plate are made of a plastic material.

7. A slip ring arrangement according to claim 1, characterized in that the labyrinth sealing means includes a labyrinth plate adapted to be secured to an outer steering column of the steering wheel.

8. A slip ring arrangement according to one of claims 1, 2, 3, or 4, characterized in that the components of the motor vehicle include at least one of a vehicle horn and a gas generator means for an air bag installation.

* * * * *